June 2, 1970

R. GRABNER 3,515,444

WIPER CONSTRUCTION FOR USE IN CONJUNCTION WITH
SLIDES IN MACHINES

Filed June 14, 1968

INVENTOR
Ruth Grabner
BY
ATTORNEYS

June 2, 1970          R. GRABNER          3,515,444
WIPER CONSTRUCTION FOR USE IN CONJUNCTION WITH
SLIDES IN MACHINES Filed June 14, 1968          2 Sheets-Sheet 2

INVENTOR
Ruth Grabner

United States Patent Office 3,515,444
Patented June 2, 1970

3,515,444
**WIPER CONSTRUCTION FOR USE IN CONJUNC-
TION WITH SLIDES IN MACHINES**
Ruth Grabner, Worcester, England, assignor to Industrial
Trading Company Limited, Worcester, England
Filed June 14, 1968, Ser. No. 737,216
Int. Cl. F16c *17/00, 21/00, 29/00*
U.S. Cl. 308—3.5                                    8 Claims

ABSTRACT OF THE DISCLOSURE

A machine guideway wiper construction for mounting on a slide incorporates a rigid mounting strip, a rigid wiper strip and a body of resilient deformable material bonded to the strips and forming a yielding connection between the strips. The resilient deformable material is substantially enclosed by the strips when in position on the slide to prevent damage thereto by swarf, coolant and other foreign matter.

BACKGROUND OF THE INVENTION

This invention relates to a wiper construction for use in conjunction with slides in machines, and particularly machine tools, and the purpose of such wiper construction is to prevent the ingress of foreign matter between the bearing surfaces of the slides and their guideways.

Various types of wiper construction have been proposed in the past but suffer from sundry disadvantages. In particular, wipers which are provided with a wiping lip of rubber or a resilient synthetic resin material may suffer from contact with the machining coolants used or with hot swarf. On the other hand, these are preferable in some ways to the all metal types in which either there are several parts to be assembled together on the slide and which are subject to chatter, or there is a spring steel or Phosphor bronze strip which is vulnerable to mechanical damage and rapid wear and which may damage the surface of the guideway.

It is an object of the invention to provide a wiper construction in which the major disadvantages of the known constructions are avoided or at least made less injurious.

SUMMARY OF THE INVENTION

A wiper construction for use in conjunction with slides in machines, comprising a rigid mounting strip of L-shaped section defined by a pair of flanges in mutually transverse planes, a rigid wiping strip having a wiping edge adjacent the edge of one of the flanges of the mounting strip, and a body of resilient deformable material interposed between the two strips and bonded thereto, said body of resilient deformable material having an exposed face adjacent the edge of the other flange of the mounting strip and otherwise being substantially enclosed between the mounting strip and wiping strip, said exposed face and said edge of the other flange being abutted against a slide when the wiper construction is mounted thereon so that the wiping strip is urged resiliently by the body of resilient deformable material into wiping contact with a coacting guideway.

BRIEF DESCRIPTION OF THE DRAWINGS

In the accompanying drawings

DETAILED DESCRIPTION OF THE INVENTION

Figure 1:
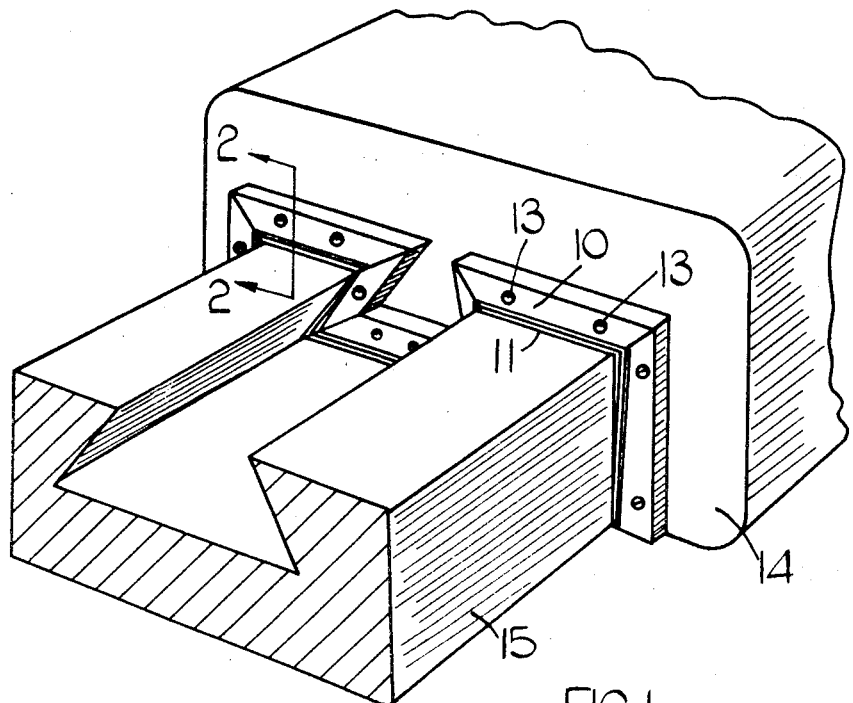
FIG. 1 is a fragmentary diagrammatic perspective view of a machine tool slide and guideway incorporating an example of a wiper construction in accordance with the invention.
Figure 2:
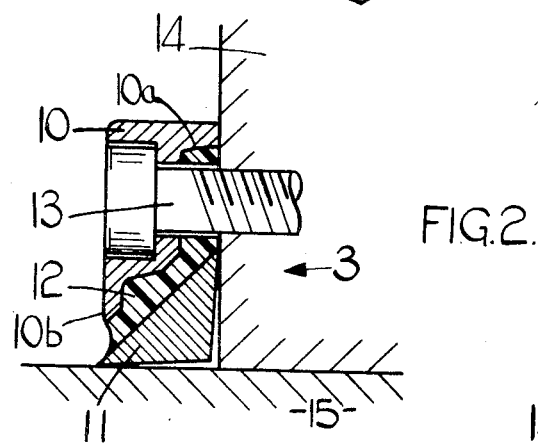
FIG. 2 is a fragmentary section on line 2—2 in FIG. 1.

In FIGS. 1 and 2 the wiper construction comprises a mounting strip 10, a wiping strip 11 and a body 12 of resilient deformable synthetic plastics material bonded to the strips 10 and 11.

The wiping strip 11 is rigid and of triangular form in cross-section, having an obtuse angle at one corner. The face of the wiper strip opposite the obtuse angle is bonded to the body 12.

The mounting strip 10, which is a rigid steel member, is basically of inverted L-shaped cross-section with a horizontal web 10$^a$ and a depending vertical flange 10$^b$. The flange 10$^b$ is substantially thickened at its juncture with the web 10$^a$ to enable drillings through the flange 10$^b$ to be counterbored. These counterbored drillings receive mounting bolts 13 with their heads flush with the outer face of the depending flange 10$^b$.

The strip 11 is arranged relative to the strip 10 so that the obtuse-angled edge of the former is opposite the juncture of the web 10$^a$ and the flange 10$^b$. The uppermost edge of the strip 11 is coplanar with the free edge of the web 10$^a$ and the common plane is parallel to the outer face of the flange 10$^b$. The body 12 has an exposed face in this location, but the face is formed with a plurality of dimples, projections or (as shown) ribs 12$^a$. There are passages through the body 12 aligned with the drillings in the flange 10$^b$ for the mounting bolts 13.

The bolts 13 are used to attach the wiper construction to a slide 14, the latter having tapped holes to receive the bolts. The wiper is mitre cut to fit neatly in and around corners in the profile of the slide 14. It will be seen from the drawings that one tip of the wiping strip 11 bears on the face of the slide 14 as does the free end of the web 10$^a$ of the mounting strip 10 and the exposed face of the body 12. This ensures that there is no chatter of the wiping strip when the slide is advanced.

The wiping pressure applied by the strip 11 to a guideway 15 can be varied by adjusting the bolts 13. Tightening of such bolts causes the strip 10 to pivot about the free edge of web 10$^a$ to apply compressive forces to the body 12. Deformation of the body 12 is accommodated by the dimpled or otherwise non-planar face.

The body 12 is enclosed everywhere except along the face exposed beneath the lower edge of the flange 10$^b$. Thus, the danger of the body being deleteriously affected by coolants, swarf and the like is substantially reduced.

Figure 4:
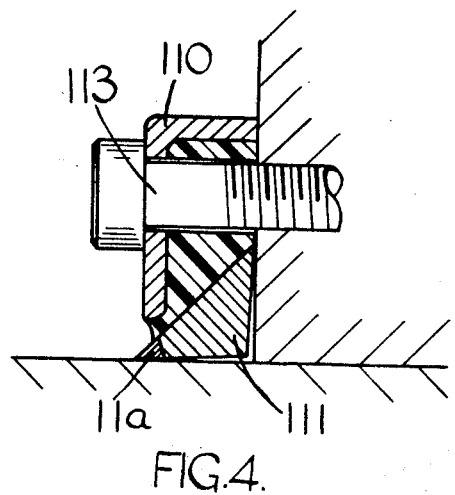

FIG. 4 shows a wiper construction incorporating two modifications. Firstly, a wiping strip 111 has its wiping edge formed of a hard material such as a cement or cemented carbide. This edge may be formed in many ways for example by sintering, hot rolling, spraying or galvanizing processes. In addition, in the example shown in FIG. 4 the mounting strip 110 is of simple L-section, with the heads of bolts 113 projecting therefrom.

Figure 5:
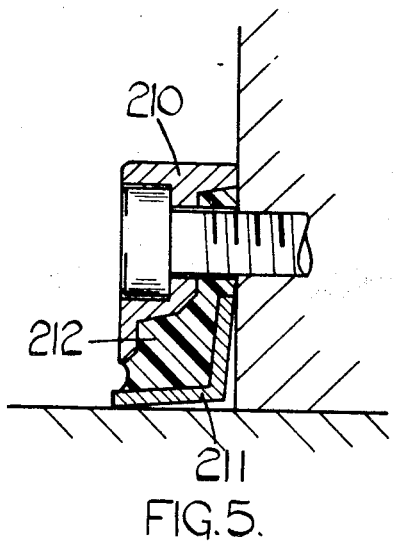

In the example shown in FIG. 5, a mounting strip 210 is the same as that shown in FIG. 2. A wiping strip 211 is. however, of shallow V-shaped cross-section with an obtuse angle at its corner edge. A resilient body 212 is correspondingly shaped.

Figure 3:
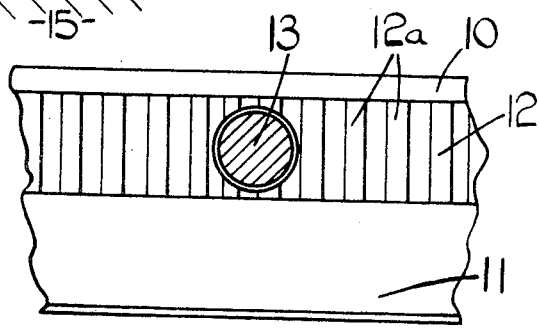
FIG. 3 is a view of the wiper construction on arrow 3 in FIG. 2 and FIGS. 4 to 6 are sections similar to FIG. 2 but illustrating alternative forms of the invention.
Figure 6:
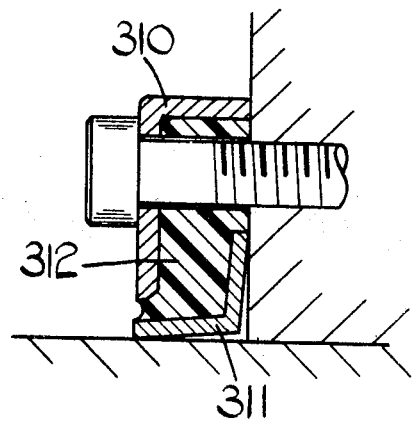

Finally, in FIG. 6, the wiper construction consists of a mounting strip 310 as used in the example shown in FIG. 3, a wiping strip 311 as shown in FIG. 4, and a body 312 of the usual resilient material filling the intervening space.

In any of the examples shown in FIGS. 2, 5 and 6 a hard material can be added to the wiping strip 11, 211 or 311 to form the wiping edge thereof.

Having thus described my invention what I claim as new and desire to secure by Letters Patent is:

1. A wiper construction for use in conjunction with slides in machines comprising a rigid mounting strip of L-shaped section defined by a pair of flanges in mutually transverse planes, a rigid wiping strip having a wiping edge adjacent the edge of one of the flanges of the mounting strip, and a body of a resilient deformable material interposed between the two strips and bonded thereto, said body being provided with an exposed face adjacent the edge of the other flange of the mounting strip and otherwise being substantially enclosed between the strips, the exposed face and the edge of said other flange being abutted against a slide when the wiper construction is mounted thereon so that the wiping strip is urged resiliently by said body into wiping contact with a coacting guideway.

2. The wiper construction as claimed in claim 1 in which said body of resilient deformable material is bonded to the internal surface thereof.

3. The wiper construction as claimed in claim 1 in which one of the two flanges of the mounting strip is formed with holes for bolts for securing the wiper construction to a slide, the arrangement being such that the free edge of the other flange can abut against a slide to which the wiper construction is bolted so that tightening of the bolts causes the turning of the mounting member about said free edge to urge the wiping strip more firmly into engagement with a guideway associated with the slide.

4. The wiper construction as claimed in claim 3 in which said body has a non-planar face exposed for abuttal against a face of the slide.

5. The wiper construction as claimed in claim 1 in which the wiping strip is of triangular cross-section with one angle of the triangle being obtuse, and the face of the wiping strip opposite the obtuse angle being bonded to the body of resilient deformable material.

6. The wiper construction as claimed in claim 1 in which the wiping strip is of shallow V-shaped cross-section.

7. The wiper construction as claimed in claim 1 in which the wiping strip has a wiping edge formed of a hard material.

8. In a machine having a guideway and a slide movable along said guideway, a wiper construction including a rigid mounting strip of L-shaped section defined by a pair of flanges in mutually transverse planes, a rigid wiping strip having a wiping edge adjacent the edge of one of the flanges of the mounting strip, and a body of resilient deformable material interposed between the two strips and bonded thereto, said body having an exposed face adjacent the edge of the other flange of the mounting strip and otherwise being substantially enclosed between the strips, the mounting strip being attached to the slide and the wiping strip engaging the guideway.

References Cited

UNITED STATES PATENTS

| | | | |
|---|---|---|---|
| 1,938,786 | 12/1933 | Vancil | 308—3.50 X |
| 1,337,982 | 4/1920 | Eilers | 92—240 X |
| 2,246,685 | 6/1941 | Johansen | 277—166 |
| 2,368,137 | 1/1945 | Harmon | 277—187 X |
| 2,509,151 | 5/1950 | Kasten | 277—187 X |
| 2,555,223 | 5/1951 | Cox | 308—3.5 |
| 2,713,522 | 7/1955 | Petch | 308—3.5 |
| 2,968,375 | 1/1961 | Avery | 308—3.5 X |
| 2,974,983 | 3/1961 | Meyer | 277—24 |
| 3,104,883 | 9/1963 | English | 277—235 |

FOREIGN PATENTS

| | | |
|---|---|---|
| 63,883 | 10/1955 | France. |
| 876,312 | 8/1961 | Great Britain. |
| 563,963 | 6/1957 | Italy. |
| 1,221,064 | 7/1966 | Germany. |

MARTIN P. SCHWADRON, Primary Examiner

L. L. JOHNSON, Assistant Examiner

U.S. Cl. X.R.

277—24, 166, 187